(12) United States Patent
Park et al.

(10) Patent No.: US 12,322,807 B2
(45) Date of Patent: Jun. 3, 2025

(54) METHOD OF MANUFACTURING DRY BINDERS FOR ELECTRODES AND METHOD OF MANUFACTURING DRY ELECTRODES INCLUDING DRY BINDERS

(71) Applicants: HYUNDAI MOTOR COMPANY, Seoul (KR); KIA CORPORATION, Seoul (KR); CHUNG ANG University industry Academic Cooperation Foundation, Seoul (KR)

(72) Inventors: Kyeong Wi Park, Suwon-si (KR); Han Nah Song, Ansan-si (KR); Sang Wook Han, Ansan-si (KR); In Ho Nam, Seoul (KR); Ho Jong Eom, Seoul (KR); Ji Hyeon Kang, Seoul (KR)

(73) Assignees: HYUNDAI MOTOR COMPANY, Seoul (KR); KIA CORPORATION, Seoul (KR); CHUNG ANG University industry Academic Cooperation Foundation, Seoul (KR)

(*) Notice: Subject to any disclaimer, the term of this patent is extended or adjusted under 35 U.S.C. 154(b) by 218 days.

(21) Appl. No.: 18/077,045

(22) Filed: Dec. 7, 2022

(65) Prior Publication Data
US 2023/0238536 A1  Jul. 27, 2023

(30) Foreign Application Priority Data

Jan. 24, 2022 (KR) ................. 10-2022-0009721

(51) Int. Cl.
*H01B 1/20* (2006.01)
*C08J 3/00* (2006.01)
(Continued)

(52) U.S. Cl.
CPC ............. *H01M 4/623* (2013.01); *C08J 3/005* (2013.01); *C08J 3/203* (2013.01); *C08K 3/04* (2013.01);
(Continued)

(58) Field of Classification Search
CPC ... H01B 1/00; H01B 1/20; H01B 1/22; H01B 1/24; H01M 4/621; H01M 4/622; H01M 4/623
See application file for complete search history.

(56) References Cited

U.S. PATENT DOCUMENTS 9,203,090 B2    12/2015  Stevanovic et al.
9,525,168 B2 *  12/2016  Mitchell ............. H01M 4/0409
(Continued)

FOREIGN PATENT DOCUMENTS

EP      3806219 A1      4/2021
KR      20100056263 A   5/2010
(Continued)

OTHER PUBLICATIONS

Huang et al "LiAl Co O as 4 V cathodes for lithium ion batteries", Journal of Power Sources 81-82 (1999). 690-695.*

(Continued)

*Primary Examiner* — Mark Kopec
(74) *Attorney, Agent, or Firm* — Lempia Summerfield Katz LLC (57) ABSTRACT

Disclosed herein are a method of manufacturing dry binders for electrodes usable in a dry electrode method by using a mixture of polymer powder containing a hydroxyl group (—OH) and polytetrafluoroethylene, and a method of manufacturing dry electrodes including dry binders.

10 Claims, 10 Drawing Sheets

(51) Int. Cl.

| | | |
|---|---|---|
| *C08J 3/20* | (2006.01) | |
| *C08K 3/04* | (2006.01) | |
| *C08L 27/18* | (2006.01) | |
| *C08L 71/02* | (2006.01) | |
| *H01M 4/04* | (2006.01) | |
| *H01M 4/587* | (2010.01) | |
| *H01M 4/60* | (2006.01) | |
| *H01M 4/62* | (2006.01) | |
| *H01M 4/66* | (2006.01) | |

(52) U.S. Cl.
CPC .............. *C08L 27/18* (2013.01); *C08L 71/02* (2013.01); *H01B 1/20* (2013.01); *H01M 4/0404* (2013.01); *H01M 4/0435* (2013.01); *H01M 4/587* (2013.01); *H01M 4/625* (2013.01); *H01M 4/661* (2013.01); *H01M 4/663* (2013.01); *H01M 4/667* (2013.01); *C08J 2327/18* (2013.01); *C08J 2371/02* (2013.01); *C08J 2401/28* (2013.01); *C08J 2427/18* (2013.01); *C08J 2429/04* (2013.01); *C08J 2433/02* (2013.01); *C08J 2453/00* (2013.01); *C08J 2471/02* (2013.01); *C08K 2201/001* (2013.01)

(56) References Cited

U.S. PATENT DOCUMENTS

| | | | | |
|---|---|---|---|---|
| 11,380,899 B2* | 7/2022 | Koo | .................. | H01M 4/663 |
| 11,557,758 B2* | 1/2023 | Liu | .................. | H01M 4/625 |
| 2012/0315530 A1 | 12/2012 | Kageura | | |
| 2014/0234724 A1* | 8/2014 | Nakamura | .......... | H01M 4/1393 |
| | | | | 264/105 |
| 2019/0131626 A1* | 5/2019 | Wang | .................. | H01M 4/1393 |
| 2019/0237748 A1* | 8/2019 | Shin | ...................... | H01M 4/525 |
| 2019/0305316 A1* | 10/2019 | Wang | .................. | H01M 4/0404 |
| 2021/0249657 A1* | 8/2021 | Shin | ...................... | H01M 4/622 |

FOREIGN PATENT DOCUMENTS

| | | |
|---|---|---|
| KR | 20160058274 A | 5/2016 |
| KR | 20160134548 A | 11/2016 |
| KR | 101834036 B1 | 4/2018 |
| KR | 20200017821 A | 2/2020 |
| WO | 2011102497 A1 | 8/2011 |

OTHER PUBLICATIONS

Hippauf et al "Overcoming binder limitations of sheet-type solid-state cathodes using a solvent-free dry-film approach", Energy Storage Materials 21 (2019) 390-398.*
JP 1998302780 (pub 1998) English language machine translation.*
Zhang et al "Review-Clay Mineral Materials for Electrochemical Capacitance Application", Journal of the Electrochemical Society, 2021, 168 070558 (19 pages).*
Super P carbon black (CAS No. 1333-86-4) SDS Data Sheet (2025).*
Thinky Technology "Rotation and revolution technology—Principles and characteristics", Thinky USA, Inc. (no pub date).*
CN 104779368 (pub 2015) English language translation.*
Lim et al "The effect of binders on the rheological properties and the microstructure formation of lithium-ion battery anode slurries", Journal of Power Sources 299 (2015) 221-230.*
CN 104779368 (pub 2015) English language machine translation.*

* cited by examiner

FILM FORMATION AFTER
USING THINKY MIXER : ○

FIG. 11B

FILM FORMATION AFTER
USING MINI-MILL : ×

METHOD OF MANUFACTURING DRY BINDERS FOR ELECTRODES AND METHOD OF MANUFACTURING DRY ELECTRODES INCLUDING DRY BINDERS

CROSS-REFERENCE TO RELATED APPLICATION

This application claims under 35 U.S.C. § 119(a) the benefit of priority to Korean Patent Application No. 10-2022-0009721 filed on Jan. 24, 2022, the entire contents of which are incorporated herein by reference.

BACKGROUND

(a) Technical Field

The present disclosure relates to a method of manufacturing dry binders for electrodes usable in a dry electrode method by using a mixture of polymer powder containing a hydroxyl group (—OH) and polytetrafluoroethylene, and a method of manufacturing dry electrodes including dry binders.

(b) Background Art

A conventional anode composite for lithium-ion secondary batteries includes a binder, an active material including graphite, a conductive material for increasing conductivity of the active material, and a solvent.

However, the common use of the solvents causes environmental issues, and additional solvent recovery and waste disposal may be costly.

In addition, a sufficient drying time is required to completely remove the solvent, and the binder is lifted in the process of drying, which weakens the adhesion with an electrode.

The binder commonly used in a wet process blocks a migration path of ions or has a low density of energy per volume due to the volume occupied by the binder, thereby decreasing physical properties and electrochemical performance, which results in a low rate of discharge.

On the other hand, the binder used for anodes serves as a bridge between anode active materials and functions to attach a current collector. Thus, if the binder is not suitable for anode material, the binder causes structural destruction, peeling, and deformation, and thus continues to form an SEI layer, which leads to a rapid decrease in capacity and cycle life.

Therefore, there is a need to develop a binder usable in production of an anode through a dry process while having excellent performance.

The above information disclosed in this Background section is only for enhancement of understanding of the background of the disclosure and therefore it may contain information that does not form the prior art that is already known to a person of ordinary skill in the art.

SUMMARY OF THE DISCLOSURE

The present disclosure has been made in an effort to solve the above-described problems associated with prior art.

In an aspect, the present disclosure provides a method of manufacturing dry binders for electrodes usable in production of an anode through a dry process while having excellent performance, and a method of manufacturing dry electrodes including dry binders.

The present disclosure is not limited to the above-mentioned aspect. Other aspects of the present disclosure are apparent from the following description, and are by means and combinations thereof as defined in the following claims.

In an embodiment, there is provided a method of manufacturing dry binders for electrodes, which includes preparing a polymer powder containing a hydroxyl group (—OH) and producing a first mixture by mixing the polymer powder with polytetrafluoroethylene.

The polymer powder may be pulverized at 30 to 60 Hz vibration for 1 to 10 minutes.

The polymer powder may have a number average molecular weight (Mn) in a range of 10,000 to 1,000,000 g/mol.

The polymer powder may have a weight average molecular weight (Mw) in a range of 10,000 to 10,000,000 g/mol.

The polymer powder may include the hydroxyl group (—OH) in an amount of 10% by weight or less.

The polymer powder may include polyethylene glycol (PEG), polyvinyl acetate (PVA), polyacrylic acid (PAA), carboxymethyl cellulose (CMC), polycyclic acid (PAA)-carboxymethyl cellulose (CMC), or combinations thereof.

The producing a first mixture may be performed at 1500 to 2500 rpm for 10 to 30 minutes.

The first mixture may include 40 to 60% by weight of the polytetrafluoroethylene and 40 to 60% by weight of the polymer powder.

A dry binder may use no solvent.

In another embodiment, a method of manufacturing dry electrodes is provided. The method includes preparing a polymer powder containing a hydroxyl group (—OH), producing a first mixture by mixing the polymer powder with polytetrafluoroethylene, producing a second mixture by mixing an active material and a conductive material, making a clay-like product by mixing the first mixture with the second mixture, applying the clay-like product to a surface-treated current collector, and rolling the clay-like product to manufacture an electrode.

The polymer powder may include polyethylene glycol (PEG), polyvinyl acetate (PVA), polyacrylic acid (PAA), carboxymethyl cellulose (CMC), polycyclic acid (PAA)-carboxymethyl cellulose (CMC), or combinations thereof.

The first mixture may include 40 to 60% by weight of the polytetrafluoroethylene and 40 to 60% by weight of the polymer powder.

The producing a second mixture may be performed at 1500 to 2500 rpm for 10 to 30 minutes.

The conductive material may include carbon black Super P, and the active material may include graphite. The making a clay-like product may be performed at 1500 to 2500 rpm for 1 to 10 minutes.

The clay-like product may include 1 to 5% by weight of a dry binder, 92 to 98% by weight of the active material, and 1 to 3% by weight of the conductive material.

Surface treatment may be performed by coating the surface of the current collector with carbon to a thickness in a range of 10 to 30 micrometers (μm).

The current collector may include copper (Cu), nickel (Ni), titanium (Ti), tungsten (W), iron (Fe), chromium (Cr), stainless steel, or combinations thereof.

In the rolling the clay-like product, the clay-like product may be roll-pressed at a temperature in a range of 10 to 30° C. at a rate in a range of 1 to 5 cm/s.

The electrode may use no solvent.

Other aspects and embodiments of the disclosure are discussed infra.

The terms "vehicle" or "vehicular" or other similar terms as used herein are inclusive of motor vehicles in general such as passenger automobiles including sports utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure are described in detail below with reference to certain exemplary embodiments thereof illustrated the accompanying drawings which are given hereinbelow by way of illustration only, and thus are not limitative of the present disclosure.

It should be understood that the appended drawings are not necessarily to scale, presenting a simplified representation of various features illustrative of the basic principles of the disclosure. The specific design features of the present disclosure as disclosed herein, including, for example, specific dimensions, orientations, locations, and shapes are determined in part by the particular intended application and use environment.

In the figures, reference numbers refer to the same or equivalent parts of the present disclosure throughout the several figures of the drawing.

DETAILED DESCRIPTION

Hereinafter, reference is made in detail to various embodiments of the present disclosure, examples of which are illustrated in the accompanying drawings and described below. While the disclosure is described in conjunction with exemplary embodiments, that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The above and other aspects, features, and advantages of the present disclosure are understood with reference to the following embodiments in conjunction with the accompanying drawings. The present disclosure may, however, be embodied in different forms and should not be construed as being limited to the embodiments set forth herein. Rather, these embodiments are provided so that this disclosure is thorough and complete, and fully conveys the scope of the present disclosure to those skilled in the art.

Throughout the disclosure, like reference numerals refer to like elements throughout the various figures. The drawings are not necessarily to scale and in some instances, proportions may have been exaggerated in order to clearly illustrate features of the present disclosure. Terms such as "first" and/or "second" may be used herein to describe various elements of the present disclosure, but these elements should not be construed as being limited by the terms. These terms are used only for the purpose of differentiating one element from other elements of the present disclosure. For example, without departing from the scope and spirit of the present disclosure, a first element may be referred to as a second element, and, similarly, a second element may also be referred to as a first element. As used herein, the singular forms "a", "an" and "the" are intended to include the plural forms as well, unless the context clearly indicates otherwise.

It should be understood that the terms "comprises/includes" and/or "comprising/including", when used in the specification, specify the presence of stated features, integers, acts, operations, elements, components, and/or groups thereof, but do not preclude the presence or addition of one or more other features, integers, acts, operations, elements, components, and/or groups thereof. When a part such as a layer, a film, a region, or a plate is referred to as being "on" another part, it not only refers to the case where the part is "directly on" the other part but also the case where a further part exists in between. Conversely, when a part such as a layer, a film, a region, or a plate is referred to as being "beneath" another part, it not only refers to the case where the part is "directly beneath" the other part but also the case where a further part exists in between.

Unless otherwise specified, all numbers, values, and/or expressions representing quantities of ingredients, reaction conditions, polymer compositions and formulations used herein are approximations that reflect various uncertainties in the measurement that arise in obtaining such values, among others, in nature as these numbers are inherently different, so the same should be understood as being modified by the term "about" in all cases. In addition, where numerical ranges are disclosed in the description, such ranges are continuous and include all values from the minimum to the maximum within the range, unless otherwise indicated. Furthermore, when such ranges refer to integers, they include all integers from the minimum to the maximum within the range, unless otherwise indicated.

Figure 1:
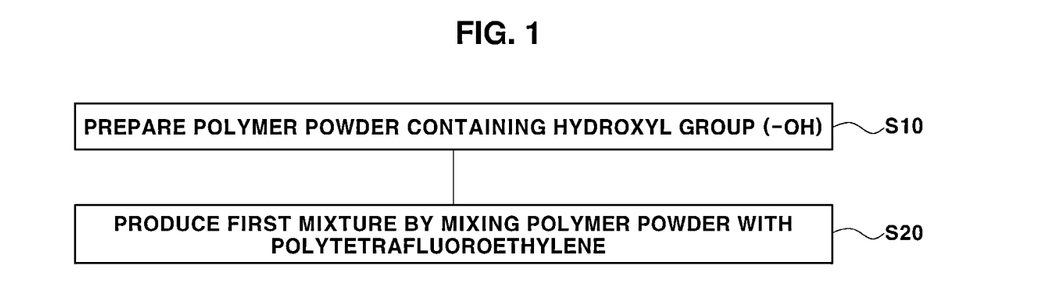
FIG. 1 is a flowchart illustrating a method of manufacturing dry binders for electrodes according to an embodiment.

The present disclosure relates to a method of manufacturing dry binders for electrodes. Exemplary embodiments of the present disclosure are described below in more detail with reference to the accompanying drawings. FIG. 1 is a flowchart illustrating a method of manufacturing dry binders for electrodes according to the present disclosure. Referring to the drawing, the method includes preparing a polymer powder containing a hydroxyl group (—OH) (act S10) and producing a first mixture by mixing the polymer powder with polytetrafluoroethylene (act S20).

First, in act S10, the polymer powder containing the hydroxyl group (—OH) is prepared.

The polymer powder may have a number average molecular weight (Mn) of 10,000 to 1,000,000 g/mol or a weight average molecular weight (Mw) of 10,000 to 10,000,000 g/mol.

The polymer powder may include the hydroxyl group (—OH) in an amount of 10% by weight or less. The polymer powder may include polyethylene glycol (PEG), polyvinyl acetate (PVA), polyacrylic acid (PAA), carboxymethyl cellulose (CMC), polycyclic acid (PAA)-carboxymethyl cellulose (CMC), or combinations thereof.

Here, the large particle polymer powder such as PEG, PVA, PAA, or CMC may be pulverized in a powder form at 30 to 60 Hz vibration for 1 to 10 minutes using a pulverizer such as a ball mill.

In act S20, the first mixture is produced by mixing the polymer powder with the polytetrafluoroethylene.

The first mixture may be produced by mixing them at 1500 to 2500 rpm for 10 to 30 minutes.

In this case, the mixing method is not particularly limited, and the mixing may be performed using a mixer such as a Thinky mixer, a mini mill, a planetary mixer, a ball mill, or a homo mixer.

The first mixture may include 40 to 60% by weight of the polytetrafluoroethylene and 40 to 60% by weight of the polymer powder.

The dry binder manufactured in this way has the advantage of using no solvent.

Figure 2:
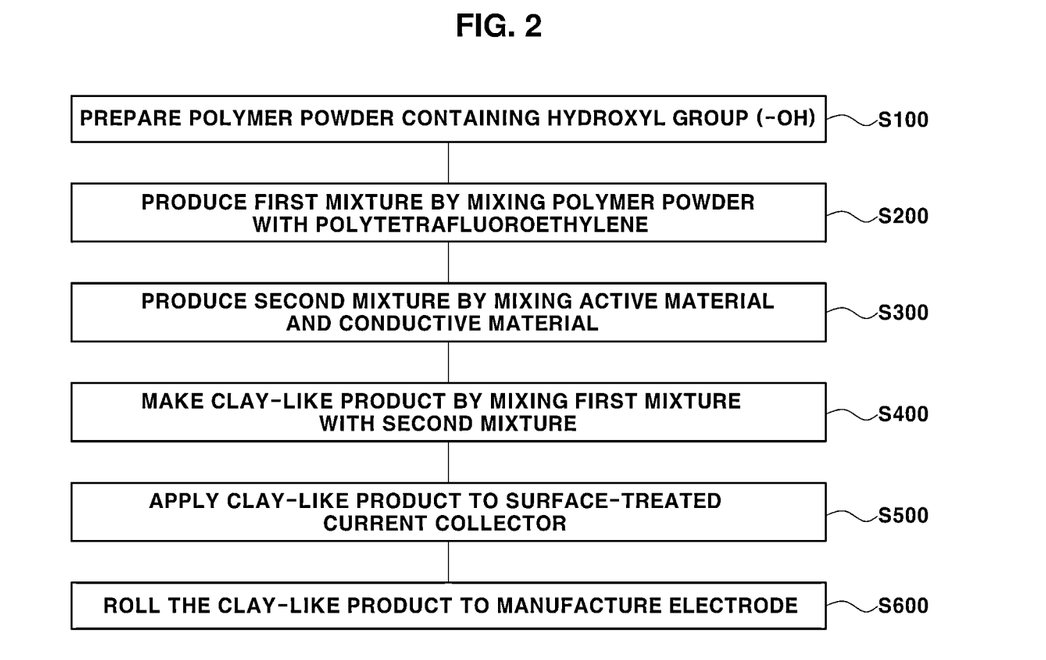
FIG. 2 is a flowchart illustrating a method of manufacturing dry electrodes according to an embodiment.

In another aspect, the present disclosure relates to a method of manufacturing dry electrodes including dry binders. FIG. 2 is a flowchart illustrating a method of manufacturing dry electrodes according to the present disclosure. Referring to the drawing, the method includes preparing a polymer powder containing a hydroxyl group (—OH) (act S100), producing a first mixture by mixing the polymer powder with polytetrafluoroethylene (act S200), producing a second mixture by mixing an active material and a conductive material (act S300), making a clay-like product by mixing the first mixture with the second mixture (act S400), applying the clay-like product to a surface-treated current collector (act S500), and rolling the clay-like product to manufacture an electrode (act S500).

Prior to describing the method, the first mixture refers to a dry binder, and a description of acts S100 and S200 is omitted because they are equal to those in the method of manufacturing dry binders.

The polymer powder in acts S100 and S200 may include polyethylene glycol (PEG), polyvinyl acetate (PVA), polyacrylic acid (PAA), carboxymethyl cellulose (CMC), polycyclic acid (PAA)-carboxymethyl cellulose (CMC), or combinations thereof. The first mixture may include 40 to 60% by weight of the polytetrafluoroethylene and 40 to 60% by weight of the polymer powder.

In act S300, the second mixture is produced by mixing the active material and the conductive material.

Specifically, the conductive material may include carbon black Super P, and may be used in combination with materials used in lithium secondary batteries.

The active material may include graphite. The active material may be used in combination with materials used in lithium secondary batteries.

The act of producing a second mixture may be performed at 1500 to 2500 rpm for 10 to 30 minutes.

In act S400, the clay-like product is made by mixing the first mixture with the second mixture. The clay-like product may be made by mixing the first mixture with the second mixture at 1500 to 2500 rpm for 1 to 10 minutes. Here, the mixtures mixed uniformly may be formed into a film.

In acts S300 and S400, the mixing method is not particularly limited, and the mixing may be performed using a mixer such as a Thinky mixer, a mini mill, a planetary mixer, a ball mill, or a homo mixer.

In act S500, the clay-like product is applied to the surface-treated current collector.

The clay-like product may include 1 to 5% by weight of the dry binder, 92 to 98% by weight of the active material, and 1 to 3% by weight of the conductive material.

Here, the surface treatment may be performed by coating the surface of the current collector with carbon to a thickness of 10 to 30 μm. In this case, the current collector may include copper (Cu), nickel (Ni), titanium (Ti), tungsten (W), iron (Fe), chromium (Cr), stainless steel, or combinations thereof.

In act S600, the clay-like product is rolled to manufacture the electrode. The method of rolling the clay-like product is not particularly limited, and the electrode may be manufactured by using a pair of rollers or by pressurization and heat treatment with a press machine, a heating roll press, or the like.

Here, the clay-like product may be attached, by applying heat and pressure thereto, to the surface of the current collector. In this case, the clay-like product may be roll-pressed at a rolling temperature in a range of 10 to 30° C. at a rate in a range of 1 to 5 cm/s.

Specifically, a lower roll may be set to have a temperature of 20° C., and an upper roll may be set to have a temperature of 20° C. and a rate of 2 cm/s, so that the clay-like product is attached, by applying heat and pressure thereto, to the current collector to a desired thickness.

The dry electrode manufactured in this way has the advantage of using no solvent.

Hereinafter, the present disclosure is described in more detail through specific experimental examples. The following experimental examples are provided by way of example only to help the understanding of the present disclosure, and the scope of the present disclosure is not limited thereto.

Experimental Example 1

In order to select the ratio of the active material, the conductive material, and the dry binder in the method according to the present disclosure, the following tests were performed.

The purpose of the tests were to reduce the ratio of the conductive material and increase the ratio of the active material in order to increase the conductivity of the anode produced by the method of the present disclosure compared to the cathode.

The active material (graphite), the conductive material (Super P), and the binder (PTFE) were tested at the ratio of 93:5:2 and at the ratio of 97:1:2 to check a change in performance and select an optimal ratio.

The input amount of each component is illustrated in Table 1 below.

TABLE 1

|  | Comparative Example 1 | Example 1 | Comparative Example 2 | Example 2 |
|---|---|---|---|---|
| Anode active material (Graphite) | 93 | 93 | 97 | 97 |
| Conductive material (Super P) | 5 | 5 | 1 | 1 |
| Binder PVDF solution | 2 | 0 | 2 | 0 |
| PTFE | 0 | 2 | 0 | 2 |

Figure 3:
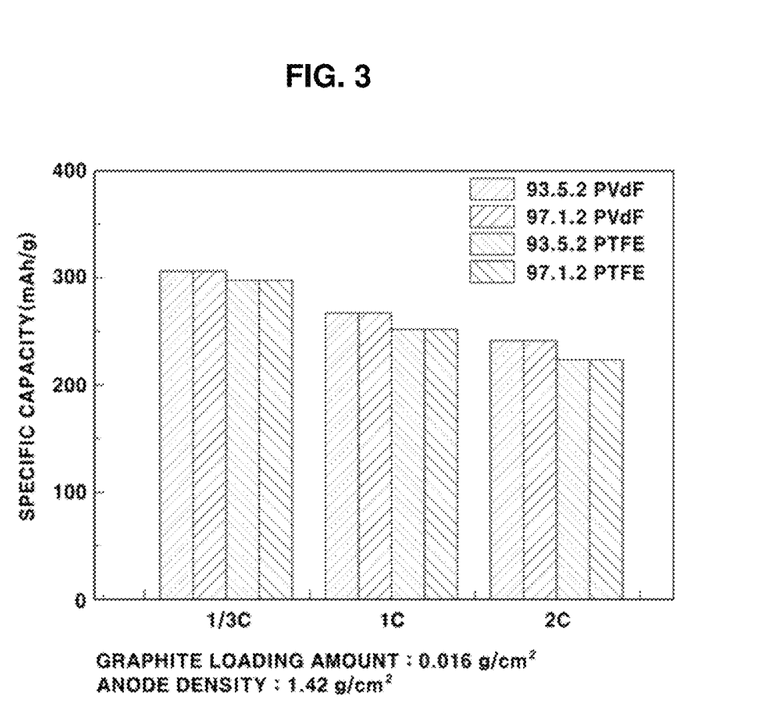
FIG. 3 illustrates a result of a binder performance test according to Examples and Comparative Examples.

FIG. 3 illustrates a result of a binder performance test according to Examples and Comparative Examples.

Referring to FIG. 3, in the case of PVdF with 55% by weight of a solid content at ⅓ C, it was measured to be 305.7 mAh/g and 305.1 mAh/g when the ratio of the active material, the conductive material, and the binder was 93:5:2 and 97:1:2, respectively, so that it can be seen that there is no significant difference in performance depending on the ratio.

In addition, in the case where the PTFE was used as a binder at ⅓ C, it can be seen that it was measured to be 297.2 mAh/g and 297.5 mAh/g when the ratio of the active material, the conductive material, and the binder was 93:5:2 and 97:1:2, respectively.

Accordingly, because the capacity does not decrease significantly as the active material (graphite) increases, the ratio of the active material, the conductive material, and the binder was selected as 97:1:2 with a small ratio of the conductive material.

Experimental Example 2

In order to select an optimized ratio of polymer powder (PEG) and PTFE in the method according to the present disclosure, the following test was performed.

The input amount of each component is illustrated in Table 2 below.

TABLE 2

|  |  | Experimental Example 2 | | | | | | | | |
|---|---|---|---|---|---|---|---|---|---|---|
|  |  | 1 | 2 | 3 | 4 | 5 | 6 | 7 | 8 | 9 |
| Binder | PEG | 1 | 2 | 3 | 4 | 5 | 6 | 7 | 8 | 9 |
|  | PTFE | 9 | 8 | 7 | 6 | 5 | 4 | 3 | 2 | 1 |

Figure 4:
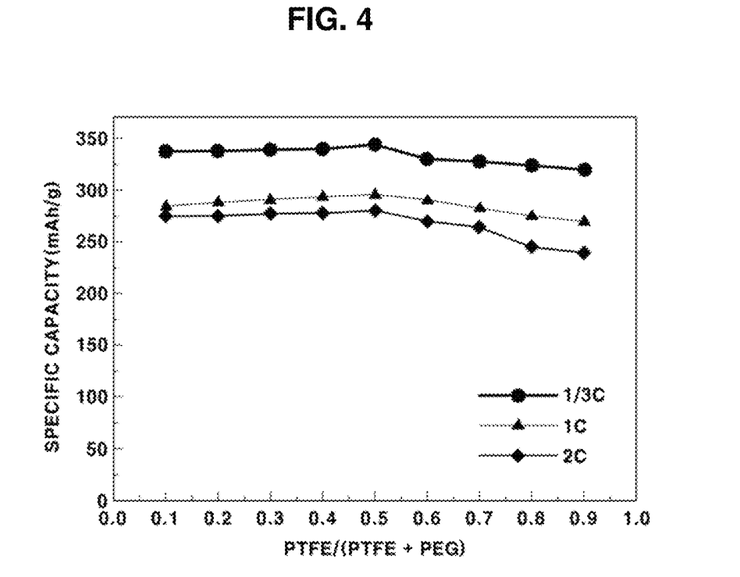
FIG. 4 illustrates a result of a secondary battery charging/discharging experiment at each C-rate according to the ratio of polymer powder.

FIG. 4 illustrates a result of a secondary battery charging/discharging test at each C-rate according to the ratio of polymer powder.

Referring to FIG. 4, when the PAA binder and the CMC binder were polymerized at 1:1, the ratio of PAA to CMC was 1:1 because the capacity retention was the highest at 2 C with 81.7%.

Experimental Example 3

A secondary battery using polymer powder (PEG) according to the present disclosure was manufactured by the following method.

Graphite as an anode active material and Super P as a conductive material were mixed in a weight ratio of 97 wt % and 1 wt % by a Thinky mixer at 2000 rpm for 2 minutes. Next, after 2 wt % of the binder manufactured in Experimental Example 2 was added, followed by additional mixing at 2000 rpm for 2 minutes, film formation was performed.

Next, a film was attached to a carbon-coated copper (Cu) current collector having a thickness of about 20 μm, and a roll press was performed to produce an anode. This is to improve the bonding force of the active material, the conductive material, and the binder, and to effectively attach the electrode material to the current collector. 1M $LiPF_6$ was used as an electrolyte containing 1 wt % of FEC additive in a mixed solvent of ethylene carbonate/dimethyl carbonate (volume ratio: 50/50), and a polyethylene separation membrane was used as a separation membrane. The battery was manufactured in a glove box in which an argon atmosphere was maintained.

Here, the manufactured battery was subjected to charging/discharging experiments within the range of 0.01 to 2.0 V at a current density in a range of 0.1 C to 2 C.

Experimental Example 4

In order to check the electrical performance of the lithium secondary battery manufactured with the binder according to the present disclosure, the following experiment was conducted.

The composition ratio of the anode was composed of the active material, the conductive material, PTFE, and the binder (PEG, PAA, CMC, PVA, PAA-CMC) in a weight ratio of 97:1:1:1. Graphite was used as the anode active material, and commercially available Super P was used as the conductive material.

The electrochemical evaluation results of the batteries including the anode assembly produced in Examples and Comparative Example are illustrated in Table 3 below.

TABLE 3

|  | Comparative Example PVDF (solid content: 55%) | Example | | | | | |
|---|---|---|---|---|---|---|---|
|  |  | PEG | PAA | CMC | PVA | PAA-CMC | PTFE |
| ⅓ C capacity (mAh/g) | 305 | 347 | 301 | 297 | 305 | 302 | 297 |
| 1 C capacity (mAh/g) | 265 | 295 | 269 | 266 | 250 | 248 | 251 |
| 2 C capacity (mAh/g) | 240 | 280 | 244 | 249 | 243 | 230 | 224 |

Referring to Table 3, the capacity according to the current density in Comparative Example and Examples according to charging/discharging is illustrated.

Referring to Table 3, the lithium-ion secondary battery including the binder using polyvinylidene fluoride (PTFE) showed a performance of about 224 mAh/g at 2 C. In addition, the performance at 2 C was 280 mAh/g for PEG, 249 mAh/g for CMC, 244 mAh/g for PAA, 243 mAh/g for PVA, and 230 mAh/g for PAA-CMC. It can be seen that all of these showed results comparable to the performance of the lithium-ion secondary battery according to Comparative Example.

Figure 5:
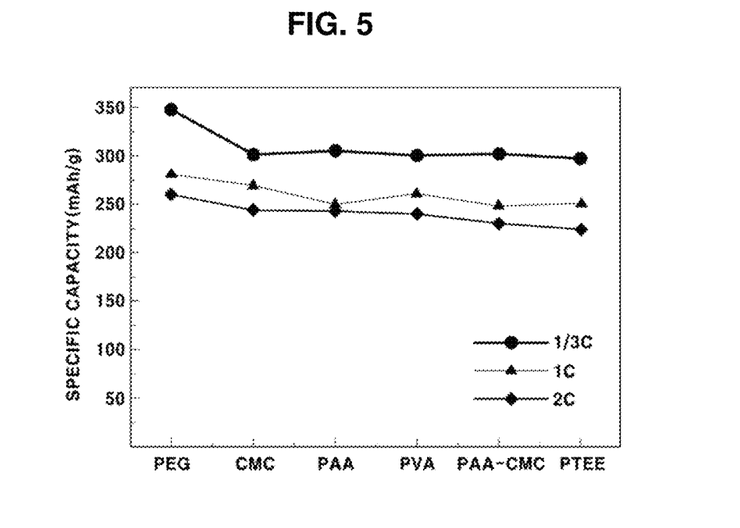
FIG. 5 illustrates a result of electrochemical properties for each of PEG, PAA, CMC, PVA, PAA-CMC, and PTFE.

FIG. 5 illustrates a result of electrochemical properties for each of PEG, PAA, CMC, PVA, PAA-CMC, and PTFE.

Referring to FIG. 5, the lithium-ion secondary battery including the binder using polyvinylidene fluoride (PTFE) showed a performance of about 224 mAh/g at 2 C.

In addition, the performance at 2 C was 280 mAh/g for PEG, 249 mAh/g for CMC, 244 mAh/g for PAA, 243 mAh/g for PVA, and 230 mAh/g for PAA-CMC. It can be seen that all of these showed results comparable to the performance of the lithium-ion secondary battery according to Comparative Example.

Experimental Example 5

In order to check the performance of the battery and the wet battery manufactured according to the present disclosure, the following experiment was conducted.

Figure 6:
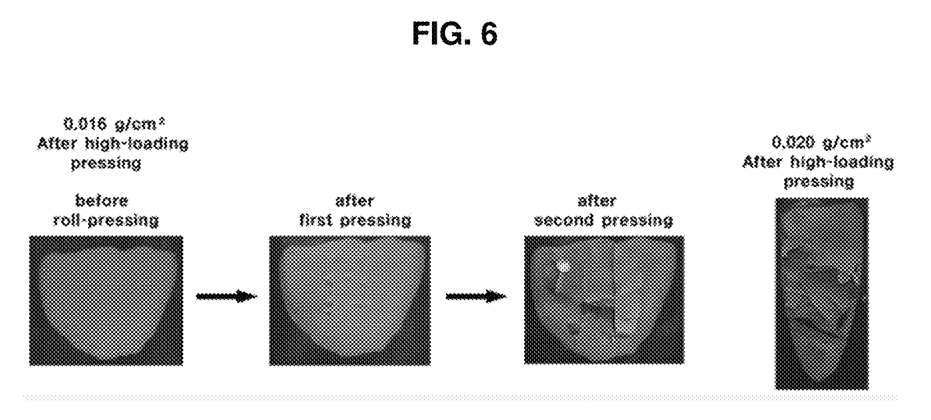
FIG. 6 illustrates a result of roll pressing to manufacture a high-loading and high-density electrode using a PVdF binder.

FIG. 6 illustrates a result of roll pressing to manufacture a high-loading and high-density electrode using a PVdF binder. Here, as pressure is applied to form a high density, cracks are generated in the electrode, and it can be seen that the electrode is detached from the substrate.

Figure 7:
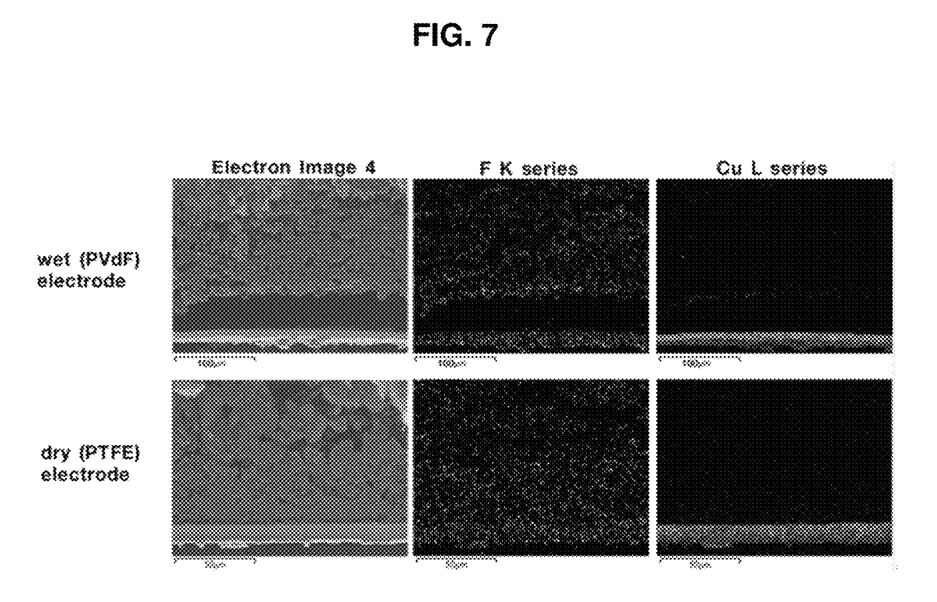
FIG. 7 illustrates an example of an SEM photograph of a wet electrode and a dry electrode.

FIG. 7 illustrates an SEM photograph of a wet electrode and a dry electrode.

Referring to FIG. 7, it can be seen through the SEM image that the substrate and the electrode are separated when the PVdF binder is used, whereas the adhesion to the substrate is large when the PTFE binder using the dry process is used.

Accordingly, the PTFE binder is a necessary binder for film formation. However, because the PTFE binder has a low lowest unoccupied molecular orbital (LUMO), it easily receives electrons in a cathodic environment and participates in the reaction, resulting in capacity loss.

Therefore, by using binders other than PTFE as additives, the capacity loss problem is solved, and other binders (PEG, PAA, CMC, PVA, PAA-CMC) are mixed and used to manufacture high-density and high-capacity batteries.

An anode for lithium-ion batteries according to Comparative Example was produced as follows through a wet process including a solvent.

The anode according to Comparative Example was first mixed with a conductive material and an anode active material (Graphite) in a Thinky mixer, and secondarily mixed with a binder together with a solvent. Then, the resultant product is applied to a metal current collector, and then dried in an oven. All kinds of carbon materials were usable as the conductive material, and Super P was used in Comparative Example. PVdF (solid content: 55%) was used as the binder, and NMP was used as the solvent suitable for the binder. The content ratio of the anode active material, the conductive material, and the binder is (Graphite:Super P:PVdF=97 wt %:1 wt %:2 wt %.

The charging/discharging experiments of the wet electrode using the PVdF binder according to Comparative Example and the dry electrode according to Example were carried out. Here, the dry electrode according to Example uses a binder in which PEG and PTFE produced in Experimental Example 4 are mixed.

Figure 8:
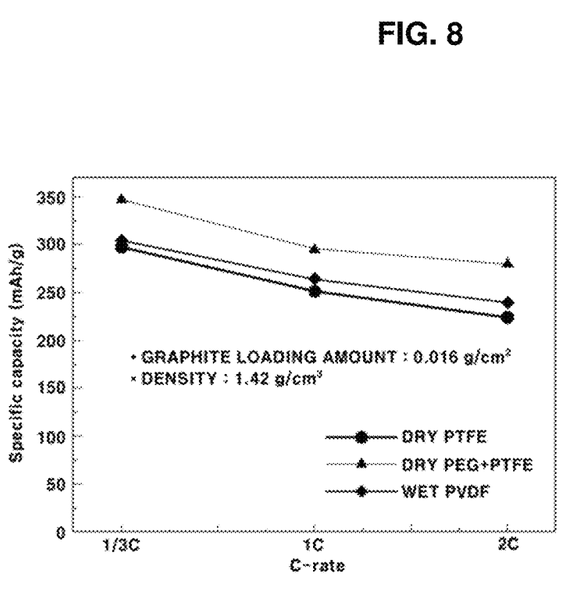
FIG. 8 illustrates a result of the charging/discharging test of the wet electrode and the dry electrode.

FIG. 8 illustrates a result of the charging/discharging test of the wet electrode and the dry electrode. Here, the charge/discharge experiment is data measured at ⅓C, 1 C, and 2 C after stabilization at 0.1 C.

Referring to FIG. 8, it can be seen that the performance of the dry electrode is excellent as the rate increases. In particular, it can be seen that the electrode using the binder mixed with PEG and PTFE shows higher performance than the electrode using the PTFE-only binder.

Next, the present technique compared the electrochemical properties with the wet electrode to evaluate the possibility of replacing the existing wet method.

An anode assembly was produced by mixing in the formulation illustrated in Table 4 below.

TABLE 4

| | | Comparative Example 1 | Example 1 | Example 2 |
|---|---|---|---|---|
| | Anode Active Material (Graphite) | 97 | 97 | 97 |
| | Conductive Material (Super P) | 1 | 1 | 1 |
| Binder | Binder (PEG, PAA, CMC, PVA, PAA-CMC, etc.) | 0 | 1 | 0 |
| | PVDF | 2 | 0 | 0 |
| | PTFE | 0 | 1 | 2 |

Figure 9:
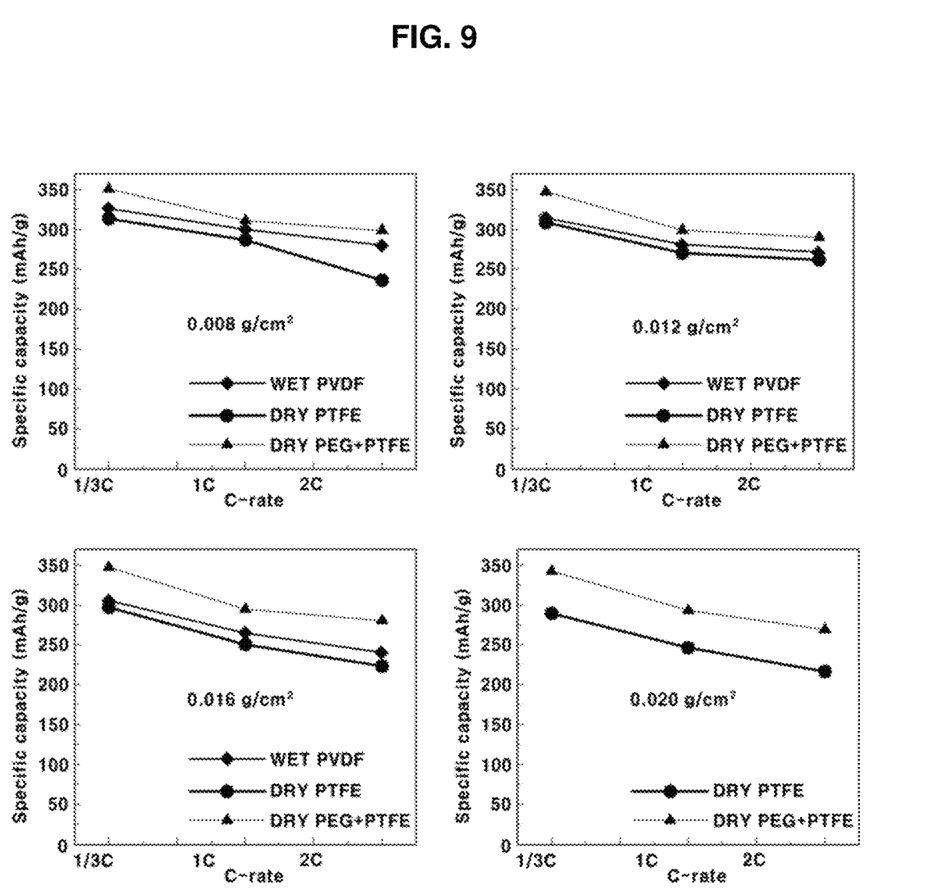
FIG. 9 illustrates a comparison of electrode performance for each C-Rate according to the amount of loading of the wet electrode and the dry electrode.

FIG. 9 illustrates a comparison of electrode performance for each C-Rate according to the amount of loading of the wet electrode and the dry electrode. Here, a wet electrode using PVDF as a binder (Comparative Example 1), a dry electrode using only PTFE as a binder (Example 1), and a dry electrode using PTFE and PEG as a binder (Example 2) were tested.

Referring to FIG. 9, it can be seen that the performance of the dry electrode is excellent at a high rate (2C) as the loading increases, although the performance is similar at a low loading amount (0.008 g/cm$^2$).

In particular, the electrode using the PEG-mixed binder exhibited performance equal to or superior to that of PTFE.

Experimental Example 6

In order to check the advantage of pre-mixing the conductive material and the active material in the clay-like product, the following experiment was conducted.

In the present disclosure, the conductive material and binder, which are added in a small amount compared to the electrode active material, have a problem in that some particles are excessively aggregated during the mixing process without a solvent.

Therefore, in order to prevent aggregation of materials, a Thinky mixer that may increase the degree of dispersion was adopted to mix electrode materials. In addition, it was attempted to maximize the dispersion of the conductive material by pre-mixing the electrode active material and the conductive material.

Figure 10A:
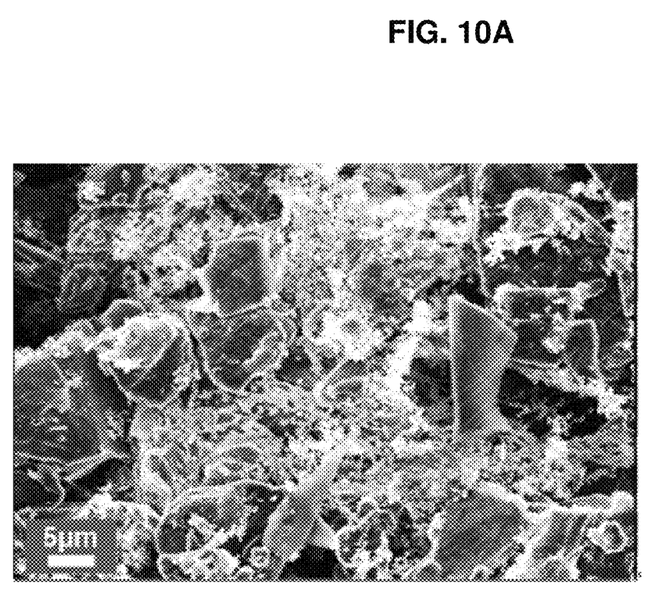
FIG. 10A illustrates an example of an SEM image of a clay-like product without pre-mixing.
Figure 10B:
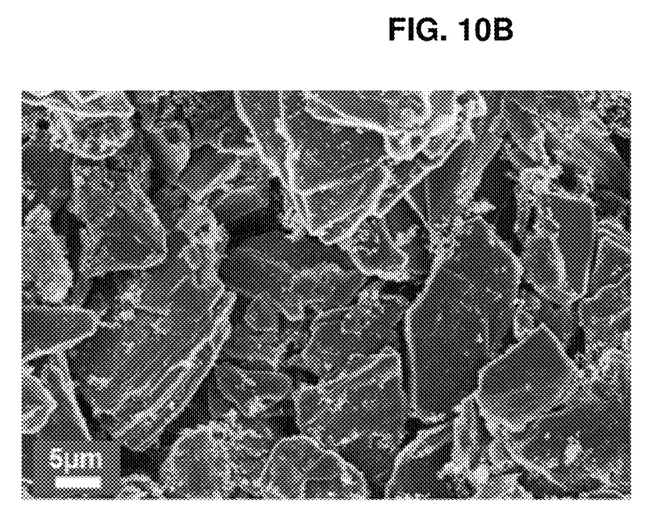
FIG. 10B illustrates an example of an SEM image of a pre-mixed clay-like product.

FIG. 10A illustrates an SEM image of a clay-like product without pre-mixing. FIG. 10B illustrates an SEM image of a pre-mixed clay-like product.

Referring to FIG. 10A, when all materials are mixed at once, it can be seen that carbon black is heavily aggregated overall.

On the other hand, referring to FIG. 10B, it can be seen that the conductive material carbon black is evenly distributed around the electrode active material when the binder is mixed after the active material and the conductive material are pre-mixed.

Experimental Example 7

In order to check whether the film was formed according to the use of the Thinky mixer, the following experiment was conducted.

Figure 11A:
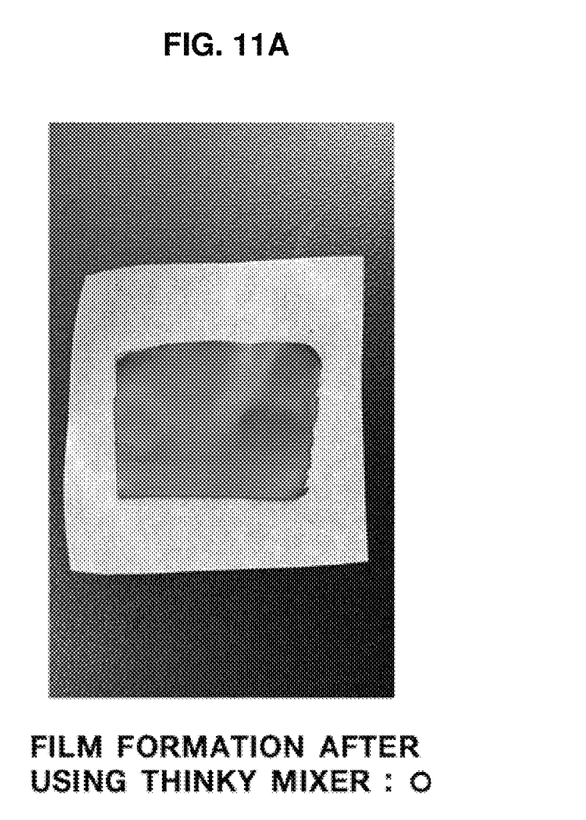
FIG. 11A illustrates an example of a state of a clay-like product using a Thinky mixer.
Figure 11B:
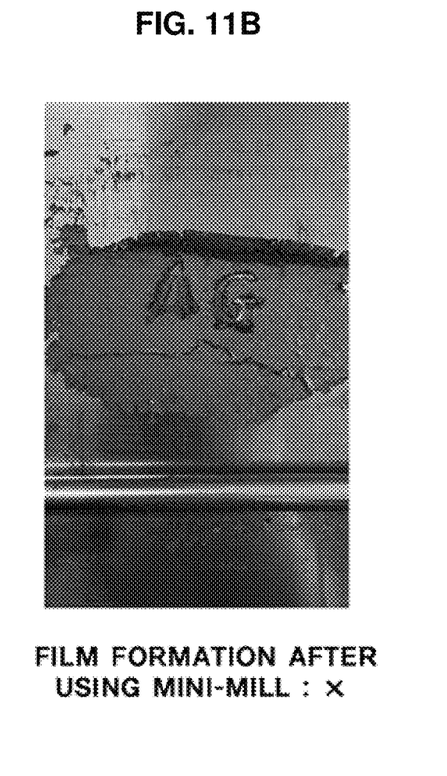
FIG. 11B illustrates an example of a state of a clay-like product without using the Thinky mixer.

FIG. 11A illustrates a state a clay-like product using a Thinky mixer. FIG. 11B illustrates a state of a clay-like product without using the Thinky mixer.

Referring to FIG. 11A, it was possible to form a film on the clay-like product using the Thinky mixer. On the other hand, referring to FIG. 10B, it was impossible to form a film on the clay-like product without using the Thinky mixer.

As is apparent from the above description, the present disclosure is characterized in that it suppresses peeling from the substrate due to charging/discharging by the limit of mixing of the binder with the anode material having the hydrophobicity of the anode of the lithium-ion secondary battery and does not use the harmful organic solvent used in the existing wet process.

In addition, the present disclosure has an advantage of high adhesion to all substrates without cracks and peeling from the substrates that occur when using the wet binder.

Furthermore, because the electrode according to the present disclosure has excellent performance at high rate (2C) as loading increases, it can be utilized for the anodes and useful for the batteries that require high output, high life, and stability, such as vehicle batteries.

The present disclosure is not limited to the above-mentioned effects. It should be understood that the present disclosure includes all effects that can be inferred from the above description.

Although the present disclosure has been described with reference to embodiments thereof, it will be understood by those skilled in the art that various modifications may be made without departing from the spirit and scope or essential features of the disclosure. Therefore, it should be understood that the embodiments described above are for purposes of illustration only in all aspects and are not intended to limit the scope of the present disclosure.

What is claimed is:

1. A method of manufacturing dry electrodes, the method comprising:
   preparing a polymer powder containing a hydroxyl group (—OH);
   producing a first mixture by mixing the polymer powder with polytetrafluoroethylene;
   producing a second mixture by mixing an active material and a conductive material;
   making a clay-like product by mixing the first mixture with the second mixture;
   applying the clay-like product to a surface-treated current collector; and
   rolling the clay-like product to manufacture a dry electrode,
   wherein the polymer powder comprises polyethylene glycol (PEG), and
   wherein in the step of producing the first mixture, mixing the polymer powder with the polytetrafluoroethylene is performed using a planetary centrifugal mixer, and
   in the step of making the clay-like product, mixing is performed using a planetary centrifugal mixer.

2. The method of claim 1,
   wherein the first mixture comprises 40 to 60% by weight of the polytetrafluoroethylene and 40 to 60% by weight of the polymer powder.

3. The method of claim 1, wherein the producing of the second mixture is performed at 1500 to 2500 rpm for 10 to 30 minutes.

4. The method of claim 1, wherein the conductive material comprises Super P carbon black, and
   wherein the active material comprises graphite.

5. The method of claim 1, wherein the making of the clay-like product is performed at 1500 to 2500 rpm for 1 to 10 minutes.

6. The method of claim 1, wherein the clay-like product comprises 1 to 5% by weight of a dry binder, 92 to 98% by weight of the active material, and 1 to 3% by weight of the conductive material.

7. The method of claim 1, wherein a surface treatment is performed by coating a surface of a current collector with carbon to a thickness in a range of 10 to 30 μm.

8. The method of claim 1, wherein the surface-treated current collector comprises copper (Cu), nickel (Ni), titanium (Ti), tungsten (W), iron (Fe), chromium (Cr), stainless steel, or any combination thereof.

9. The method of claim 1, wherein, in the rolling of the clay-like product, the clay-like product is roll-pressed at a temperature in a range of 10 to 30° C. at a rate of 1 to 5 cm/s.

10. The method of claim 1, wherein the dry electrode uses no solvent.

* * * * *